(No Model.)
M. C. RICHARDS.
GRASS COLLECTOR OR GATHERER.
No. 589,028. Patented Aug. 31, 1897.
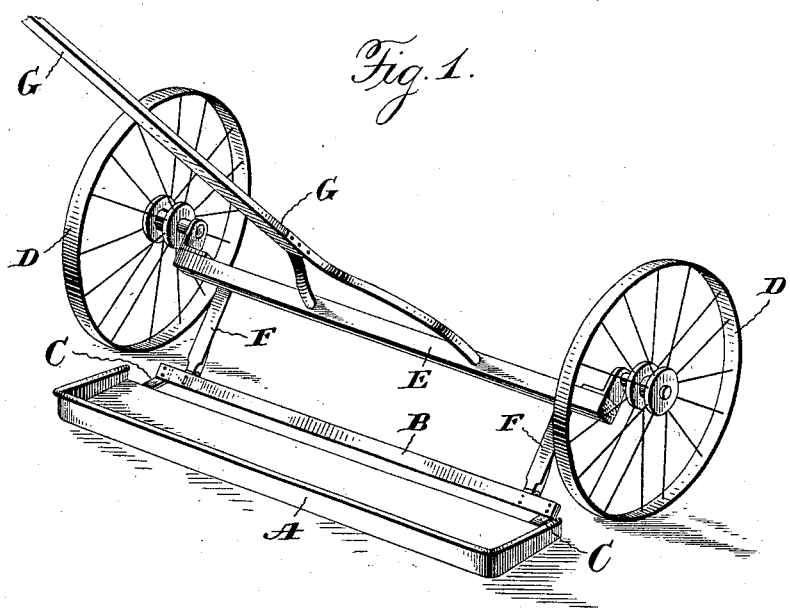
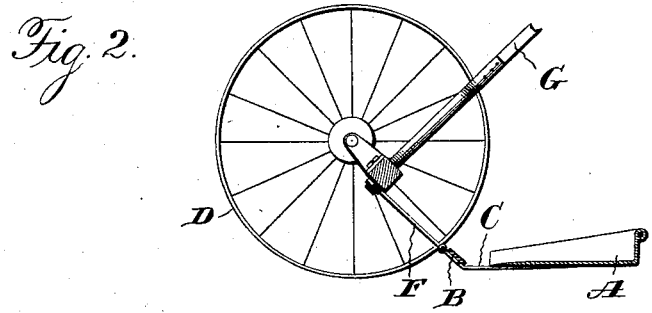
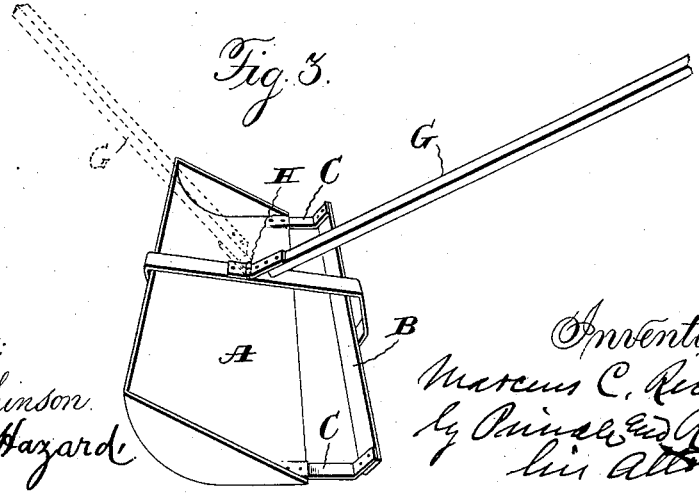
Witnesses:
Jas. E. Hutchinson
Henry C. Hazard
Inventor.
Marcus C. Richards
by Prindle and Russell
his Attorneys

UNITED STATES PATENT OFFICE.

MARCIUS C. RICHARDS, OF AURORA, ILLINOIS.

GRASS COLLECTOR OR GATHERER.

SPECIFICATION forming part of Letters Patent No. 589,028, dated August 31, 1897.

Application filed September 11, 1896. Serial No. 605,523. (No model.)

*To all whom it may concern:*

Be it known that I, MARCIUS C. RICHARDS, of Aurora, in the county of Kane, and in the State of Illinois, have invented certain new and useful Improvements in Grass Collectors or Gatherers; and I do hereby declare that the following is a full, clear, and exact description thereof, reference being had to the accompanying drawings, in which—

Figure 1 is a perspective view of my grass-gatherer; Fig. 2, a vertical section of the same; Fig. 3, a perspective view of a different form of my implement.

Letters of like name and kind refer to like parts in each of the figures.

The object of my invention is to provide a simple and yet most efficient implement for collecting or gathering into a receptacle the grass cut from lawns, leaves, and other refuse thereon; and to this end said invention consists in the implement having the features of construction substantially as and for the purpose described.

In the carrying of my invention into practice I employ a receptacle A, that resembles in shape an ordinary dust-pan—that is to say, it has a flat bottom, two sides, and a rear wall, being open at the front. Said receptacle is designed to rest upon and be moved on its flat bottom over the newly-cut grass.

A short distance in advance of the front edge of the receptacle is a preferably flat strip or bar B, which extends parallel with said edge, and whose lower edge is in the same or substantially the same plane as the front edge of the receptacle. From its said lower edge the bar or the under surface thereof inclines slightly upward and forward. Preferably said bar or strip B is attached to and supported from the receptacle A, arms C and C being riveted or otherwise attached to the receptacle-bottom and extended forward and the bar suitably connected therewith.

With the construction described it will be seen that if the implement resting upon the newly-cut grass be moved along over the same with the bar or strip B in advance the latter will strike and press forward and down the short, and hence comparatively stiff, blades of grass, and the latter as soon as released from the bar by the onward movement of the implement will fly or spring back into their normal vertical position in the space between said bar and the front edge of the receptacle. In so springing or flying back the blades will forcibly throw the grass cuttings or clippings lying loose among the same into the receptacle A. Actual test has demonstrated the entire practicability and thorough efficiency of my implement. It is not only practical, but the work of gathering the cut grass is done more thoroughly than by the use of rakes or brooms.

As shown in Fig. 1, wheels may be employed to facilitate the moving of the receptacle, said wheels D and D being journaled at opposite ends of a cross bar or beam E, to the rear side of which bars F and F connect the bar B. Preferably the connection with the latter of said bars F and F is a pivotal or hinged one, while the connection between said bars and the cross-beam E is rigid; but of course changes in these and other minor particulars may be made without departure from my invention.

A handle G, extending rearwardly from the beam E, is provided, whereby the implement may be pushed along.

In Fig. 3 I show a construction where no wheels are employed, and the handle G is pivotally connected to the device by a hinged connection H to enable it to be placed in front of or behind the same, so that it may be pulled or pushed along, as may be preferred.

The construction without wheels is obviously cheaper than the other, and it is better suited for work upon terraces.

Having thus described my invention, what I claim is—

1. A collector or gatherer for cut grass, &c., consisting of a receptacle having a device to engage and bend forward the blades of grass, and provided with an opening or space in rear of such device, wherein the blades can return to their normal position, substantially as and for the purpose specified.

2. A collector or gatherer for cut grass, &c., consisting of a receptacle having in advance of its front edge, a bar to engage and bend forward the blades of grass, substantially as and for the purpose shown.

3. A collector or gatherer for cut grass, &c., consisting of a receptacle, having in advance of its front edge a bar with an inclined under surface to engage and bend forward blades of grass, substantially as and for the purpose set forth.

4. A collector or gatherer for cut grass, &c., consisting of a receptacle, arms attached to, and extending in advance of the front edge of its bottom, and a bar attached to said arms, in advance of said edge, substantially as and for the purpose described.

In testimony that I claim the foregoing I have hereunto set my hand this 8th day of September, 1896.

MARCIUS C. RICHARDS.

Witnesses:
 H. L. KRAHL,
 I. R. CHATTLE.